(12) United States Patent
Kong et al.

(10) Patent No.: US 10,809,723 B2
(45) Date of Patent: Oct. 20, 2020

(54) METHOD AND APPARATUS FOR GENERATING INFORMATION

(71) Applicant: BAIDU ONLINE NETWORK TECHNOLOGY (BEIJING) CO., LTD., Beijing (CN)

(72) Inventors: Fanduo Kong, Beijing (CN); Jing Yan, Beijing (CN); Yang Tao, Beijing (CN); Yunyan Hu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 174 days.

(21) Appl. No.: 16/134,850

(22) Filed: Sep. 18, 2018

(65) Prior Publication Data

US 2019/0179312 A1   Jun. 13, 2019

(51) Int. Cl.

| G05D 1/00 | (2006.01) |
| G06N 3/08 | (2006.01) |
| G05D 1/02 | (2020.01) |
| G08G 1/01 | (2006.01) |
| B60W 40/02 | (2006.01) |

(52) U.S. Cl.
CPC .......... *G05D 1/0088* (2013.01); *B60W 40/02* (2013.01); *G05D 1/0221* (2013.01); *G05D 1/0246* (2013.01); *G05D 1/0276* (2013.01); *G06N 3/08* (2013.01); *G08G 1/012* (2013.01); *G08G 1/0112* (2013.01); *G05D 2201/0213* (2013.01)

(58) Field of Classification Search
CPC .. G05D 1/0088; G05D 1/0246; G05D 1/0221; G05D 1/0276; G05D 2201/0213; B60W 40/02; G06N 3/08; G06N 20/10; G06N 3/0445; G08G 1/0112; G08G 1/012; G08G 1/0133
See application file for complete search history.

(56) References Cited

U.S. PATENT DOCUMENTS

| 5,173,691 A * | 12/1992 | Sumner ................ G08G 1/0104 340/905 |
| 9,672,734 B1 * | 6/2017 | Ratnasingam ....... G08G 1/0145 |
| 9,805,601 B1 * | 10/2017 | Fields .............. G08G 1/096791 |
| 10,048,700 B1 * | 8/2018 | Curlander ........... G05D 1/0297 |

(Continued)

FOREIGN PATENT DOCUMENTS

CN          104933856 A      9/2015

*Primary Examiner* — Rodney A Butler
(74) *Attorney, Agent, or Firm* — Marshall, Gerstein & Borun LLP (57) ABSTRACT

Embodiments of the present disclosure disclose a method and apparatus for generating information. A specific embodiment of the method comprises: acquiring associated information of a road to be evaluated for driving difficulty; generating traffic environment information of the road based on the associated information; and inputting the traffic environment information of the road into a driving difficulty evaluation model to obtain a driving difficulty level of the road for an autonomous driving vehicle. The driving difficulty of the road for the autonomous driving vehicle is evaluated, to obtain the driving difficulty level of the road for the autonomous driving vehicle. Thus, based on a driving difficulty level of each road for the autonomous driving vehicle, the autonomous driving vehicle may select a road having a low driving difficulty level to drive.

17 Claims, 5 Drawing Sheets

(56) References Cited

U.S. PATENT DOCUMENTS

| | | | |
|---|---|---|---|
| 2010/0194593 A1* | 8/2010 | Mays | B60W 10/20 340/905 |
| 2012/0323474 A1* | 12/2012 | Breed | B60W 30/16 701/117 |
| 2014/0067265 A1* | 3/2014 | Maston | G01C 21/3492 701/533 |
| 2014/0210644 A1* | 7/2014 | Breed | G01S 19/17 340/905 |
| 2015/0319093 A1* | 11/2015 | Stolfus | G08G 1/0133 370/237 |
| 2017/0158191 A1* | 6/2017 | Bills | B60W 50/14 |
| 2019/0145787 A1* | 5/2019 | Akselrod | G08G 1/20 701/26 |
| 2019/0146492 A1* | 5/2019 | Phillips | G09B 9/00 701/23 |
| 2019/0217864 A1* | 7/2019 | Kusukame | G05D 1/0088 |
| 2019/0271550 A1* | 9/2019 | Breed | G08G 1/147 |
| 2020/0058218 A1* | 2/2020 | Julian | G06K 9/00697 |

* cited by examiner

METHOD AND APPARATUS FOR GENERATING INFORMATION

CROSS-REFERENCE TO RELATED APPLICATIONS

This application is related to and claims priority from Chinese Application No. 201711309598.2, filed on Dec. 11, 2017 and entitled "Method and Apparatus for Generating Information," the entire disclosure of which is hereby incorporated by reference.

TECHNICAL FIELD

The present disclosure relates to the field of computer technology, specifically to the field of autonomous driving technology, and more specifically to a method and apparatus for generating information.

BACKGROUND

An autonomous driving vehicle is a smart vehicle that controls the vehicle automatically. The more complicated the traffic environment of a road on which the autonomous driving vehicle runs is, the more costly for the autonomous driving vehicle to automatically control the vehicle, and at the same time, the higher the probability of an accident by the autonomous driving vehicle is.

SUMMARY

Embodiments of the present disclosure provide a method and apparatus for generating information.

In a first aspect, the embodiments of the present disclosure provide a method for generating information. The method includes: acquiring associated information of a road to be evaluated for driving difficulty, the associated information including road condition images and road attributes; generating traffic environment information of the road based on the associated information; and inputting the traffic environment information of the road into a driving difficulty evaluation model to obtain a driving difficulty level of the road for an autonomous driving vehicle. The driving difficulty evaluation model is used to represent a corresponding relationship between the traffic environment information and the driving difficulty level, each information item in the traffic environment information corresponds to a model parameter of the driving difficulty evaluation model, and a parameter value of each model parameter indicates an importance degree when an information item corresponding to the model parameter is used to define the driving difficulty level.

In a second aspect, the embodiments of the present disclosure provide an apparatus for generating information. The apparatus includes: an associated information acquiring unit, configured to acquire associated information of a road to be evaluated for driving difficulty, the associated information including road condition images and road attributes; a traffic information acquiring unit, configured to generate traffic environment information of the road based on the associated information; and a driving difficulty acquiring unit, configured to input the traffic environment information of the road into a driving difficulty evaluation model to obtain a driving difficulty level of the road for an autonomous driving vehicle. The driving difficulty evaluation model is used to represent a corresponding relationship between the traffic environment information and the driving difficulty level, each information item in the traffic environment information corresponds to a model parameter of the driving difficulty evaluation model, and a parameter value of each model parameter indicates an importance degree when an information item corresponding to the model parameter is used to define the driving difficulty level.

According to the method and apparatus for generating information provided by the embodiments of the present disclosure, the associated information of the road to be evaluated for driving difficulty is acquired. The associated information includes the road condition images and the road attributes. The traffic environment information of the road is generated based on the associated information. The traffic environment information of the road is inputted into the driving difficulty evaluation model to obtain the driving difficulty level of the road for the autonomous driving vehicle. The driving difficulty evaluation model is used to represent the corresponding relationship between the traffic environment information and the driving difficulty level, the each information item in the traffic environment information corresponds to the model parameter of the driving difficulty evaluation model, and the parameter value of the each model parameter indicates the importance degree when the information item corresponding to the model parameter is used to define the driving difficulty level. The driving difficulty of the road for the autonomous driving vehicle is evaluated, to obtain the driving difficulty level of the road for the autonomous driving vehicle. Thus, based on a driving difficulty level of each road for the autonomous driving vehicle, the autonomous driving vehicle may select a road having a low driving difficulty level to drive. Therefore, costs of the autonomous driving vehicle in automatically controlling the vehicle are reduced, a probability of an accident of the autonomous driving vehicle is reduced, and safety of the autonomous driving vehicle is improved.

BRIEF DESCRIPTION OF THE DRAWINGS

After reading detailed descriptions of non-limiting embodiments given with reference to the following accompanying drawings, other features, objectives, and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
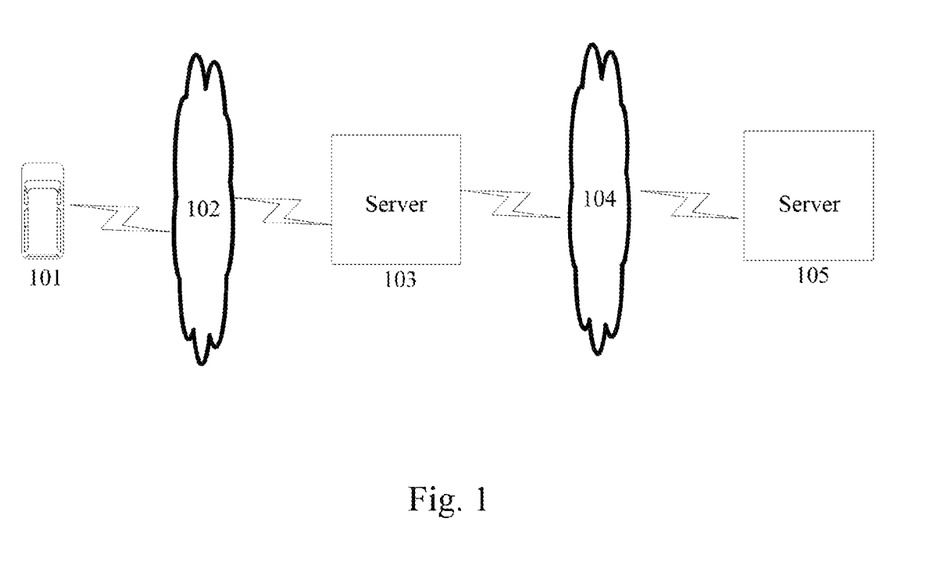
FIG. 1 illustrates an exemplary system architecture in which embodiments of a method and apparatus for generating information according to the present disclosure may be implemented.

FIG. 1 illustrates an exemplary system architecture in which embodiments of a method and apparatus for generating information according to the present disclosure may be implemented.

The system architecture includes an autonomous driving vehicle 101, a network 102, a server 103, a network 104, and a server 105. The autonomous driving vehicle 101 communicates with the server 103 via the network 102, and the server 103 communicates with the server 105 via the network 104. The network 102 may be a wireless communication network, and the network 104 may be a wired communication network.

The server 105 may be a server of a traffic surveillance and control center in a region (for example, a city), and the server stores surveillance videos of roads collected by cameras installed on the roads in the region, and each image in the surveillance videos may be referred to as a road condition image.

The server 103 may acquire a road condition image of each road in the region (for example, the city) from the server 105, and perform image recognition on the road condition image to obtain traffic environment information of the road required for evaluating a driving difficulty level of the road in the city for the autonomous driving vehicle 101. Based on the traffic environment information of the each road, a driving difficulty of the each road for the autonomous driving vehicle 101 is evaluated to obtain the driving difficulty level.

The server 103 may evaluate the driving difficulty of the each road in the region for the autonomous driving vehicle 101 every other evaluation cycle (for example, every other week), to obtain the latest driving difficulty level of the each road in the region for the autonomous driving vehicle 101.

The server 103 may respectively evaluate the driving difficulty of the each road in a region for the autonomous driving vehicle 101 during time periods (for example, a morning rush hour and an evening rush hour). The server 103 may respectively evaluate the driving difficulty of the each road in the region for the autonomous driving vehicle 101 during a plurality of time periods, and the plurality of time periods may be obtained by dividing one day. Every other evaluation cycle (for example, every other week), the server 103 may respectively evaluate the driving difficulty of the each road in the region for the autonomous driving vehicle 101 during the plurality of time periods, to obtain the latest driving difficulty level of the each road in the region for the autonomous driving vehicle 101 during each time period.

The autonomous driving vehicle 101 may automatically and preliminarily plan a plurality of driving routes based on a current location and a destination location inputted by a user. Then, an evaluation request may be sent to the server 103. The evaluation request includes: names of all roads included in the automatically and preliminarily planned driving routes.

After receiving the evaluation request, the server 103 may find the pre-evaluated driving difficulty level of each road based on the name of each road included in the automatically and preliminarily planned driving routes. The driving difficulty level of the each road in the driving routes automatically and preliminarily planned by the autonomous driving vehicle 101 for the autonomous driving vehicle 101 is sent to the autonomous driving vehicle 101. Therefore, the autonomous driving vehicle 101 may re-determine a driving route based on the received driving difficulty level of the each road for the autonomous driving vehicle 101, and drive based on the re-determined driving route.

Figure 2:
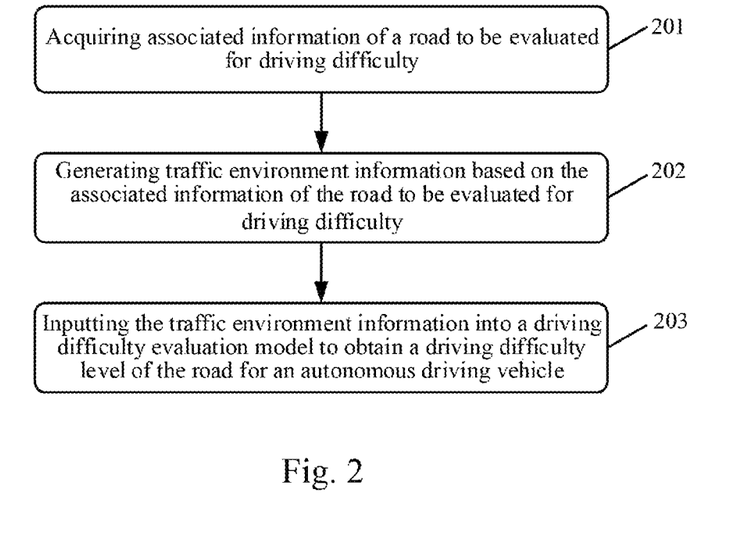
FIG. 2 is a flowchart of an embodiment of the method for generating information according to the present disclosure.

Referring to FIG. 2, FIG. 2 illustrates a flow of an embodiment of a method for generating information according to the present disclosure. The method for generating information provided by the embodiment of the present disclosure may be performed by a server (e.g., the server 103 in FIG. 1). The method includes the following steps.

Step 201, acquiring associated information of a road to be evaluated for driving difficulty.

In this embodiment, when evaluating the driving difficulty of the road for an autonomous driving vehicle, the associated information of the road may first be acquired. The associated information of the road may include, but not limited to, road condition images of the road, and road attributes of the road. The road condition images of the road may be obtained from a server of a traffic surveillance and control center. The road attributes of the road may be found from an electronic map based on the name of the road. The road attributes of the road may include, but not limited to, the type of the road, a location of each intersection on the road, and the name and location of a road facility on the road.

In this embodiment, the acquired road condition images of the road to be evaluated for driving difficulty may be collected during a time period (for example, a morning rush hour or evening rush hour).

Step 202, generating traffic environment information based on the associated information of the road to be evaluated for driving difficulty.

In this embodiment, the traffic environment information may include a plurality of information items. After the associated information (for example, the road condition images and the road attributes) of the road to be evaluated for driving difficulty is acquired, each information item in the traffic environment information of the road may respectively be calculated based on the associated information (for example, the road condition images and the road attributes) of the road. Thus, the traffic environment information of the road is generated.

For example, the traffic environment information of one road includes an average speed of vehicles on the road, a number of obstacles on the road, or a number of road facilities on the road.

For the number of obstacles on the road, a road condition image of each road section of the road may be selected from the acquired road condition image, and image recognition is respectively performed on the road condition image of the each road section to recognize obstacles on the each road section, thereby defining the number of obstacles on the road. Types of the obstacles on the road include: vehicle parked in violation of regulations, plant invading the road, and road pile.

For the number of the road facilities on the road, the road attributes of the road may be found from the electronic map based on the name of the road, and the road attributes include the names and the locations of the road facilities such as a tunnel and an overpass on the road. Thus, the number of the road facilities on the road may be calculated.

For the average speed of the vehicles on the road, two road condition images collected at an interval of a preset time length may be selected from the acquired road condition images. Then, the image recognition may be performed on the selected two road condition images to recognize vehicles included in both the road condition images. Therefore, a plurality of vehicles on the road are determined. For each recognized vehicle, the respective location of the vehicle on the road condition image is determined. Next, the location of the vehicle in a world coordinate system may be calculated based on the location of the vehicle on the road condition image and depth-of-field information of a distance between a camera collecting the road condition image and the vehicle, where the depth-of-field information indicates the road condition image. Then, for the each recognized vehicle, the respective distance between the locations of the recognized vehicle in the world coordinate system at the moments of collecting the two road condition images may be calculated. The speed of the vehicle is obtained by dividing the distance by the preset time length. After the speed of the each recognized vehicle is calculated, the average of the speeds of the recognized vehicles may be used as the average speed of the vehicles on the road.

In this embodiment, the acquired road condition images of the road to be evaluated for driving difficulty may be the road condition images collected during a time period (for example, the morning rush hour or the evening rush hour). Correspondingly, the generated traffic environment information of the road to be evaluated for driving difficulty may be traffic environment information of the road to be evaluated for driving difficulty during the time period.

In some alternative implementations of this embodiment, the traffic environment information of the road may include at least one of: the average speed of the vehicles on the road, a saturation of the road indicating a congestion degree of the road, an average number of objects of a preset type at the intersections on the road, an average number of conflict points of the intersections on the road, the number of the obstacles on the road, or the number of the road facilities on the road.

In some alternative implementations of this embodiment, the average speed of the vehicles on the road to be evaluated for driving difficulty may be defined in the following way. The length of the road may first be acquired. The road attributes of the road may be found from the electronic map based on the name of the road, and the road attributes of the road include the length of the road. Accordingly, the length of the road is acquired. The road condition images corresponding to the collection location being the starting point or terminal point of the road may be found from the acquired road condition images. A collection location corresponding to a road condition image is the location of the camera collecting the road condition image. In other words, the road condition images collected by the camera set at the starting point or terminal point of the road are found from the acquired images. Then, based on the found road condition images, a vehicle passing through the starting point of the road and a vehicle passing through the end point of the road may be determined. A vehicle passing through both the starting point of the road and the end point of the road may further be determined. That is, a vehicle passing through the road is determined.

For the vehicle passing through the road, a time difference between the time collecting the road condition image in which the location of the vehicle is the starting point of the road and the time collecting the road condition image in which the location of the vehicle is the end point of the road may be used as the time length the vehicle taking to pass through the road. The length of the road is divided by the time length to obtain the speed of the vehicle.

The respective speed of each vehicle passing through the road may be calculated. Then the average value of the speeds of the vehicles passing through the road is calculated. The average value of the speeds of the vehicles passing through the road is used as the average speed of the vehicles on the road.

In some alternative implementations of this embodiment, the saturation of the vehicles on the road to be evaluated for driving difficulty may be calculated in the following way. A result of dividing a number of vehicles passing through the road in unit time by the maximum traffic capacity of the road may be used as the saturation of the vehicles on the road. The maximum traffic capacity of the road is the maximum number of the vehicles passing through the road in the unit time.

For the number of the vehicles passing through the road in the unit time, vehicles passing through the road in a preset time length may be determined based on the road condition images collected at corresponding locations being the starting point and the end point of the road in the acquired road condition images. The result of dividing the number of the vehicles passing through the road in the preset time length by the preset time length may be used as the number of the vehicles passing through the road in the unit time.

For the maximum traffic capacity of the road, the type of the road, the number of lanes of the road, and widths of the lanes of the road may first be acquired. The road attributes of the road may be found from the electronic map based on the name of the road. The road attributes of the road include the type of the road, the number of the lanes of the road, and the widths of the lanes of the road. Then, the maximum traffic capacity of each lane of the road may respectively be calculated, and the sum of the maximum traffic capacities of all the lanes of the road is used as the maximum traffic capacity of the road.

When respectively calculating maximum traffic capacity of the each lane of the road, a standard maximum traffic capacity, an intersection reduction coefficient, a width reduction coefficient, and a lane reduction coefficient table of the road may be predefined. Based on the type of the road, the standard maximum traffic capacity of the road may be found from a table representing a corresponding relationship between a road type and a standard maximum traffic capacity. For example, when the unit time is 1 minute, in the corresponding relationship table of the road type and the standard maximum traffic capacity, the standard maximum traffic capacity corresponding to an expressway is 40 vehicles/min, the standard maximum traffic capacity corresponding to a trunk road is 30 vehicles/min, the standard maximum traffic capacity corresponding to a secondary trunk road is 26 vehicles/min, and the standard maximum traffic capacity corresponding to a branch road is 20 vehicles/min. The intersection reduction coefficient of the road may be found from related road design specifications based on a distance between intersections of the road. The width reduction coefficient of the road may be found from a width reduction coefficient table representing a corresponding relationship between a lane width and a width reduction coefficient. For example, in the width reduction coefficient table, when the lane width is 3.5 meters, the width reduction coefficient may be 1. When the lane width is 3.25 meters, the width reduction coefficient is 0.94. When the lane width is 3 meters, the width reduction coefficient is 0.85. When the lane width is 2.75 meters, the width reduction coefficient is 0.77. The lane reduction coefficient of the each lane of the road may be defined based on the lane reduction coefficient table. For example, in the lane reduction coefficient table, the lane reduction coefficient of a first lane is 1.00, the lane reduction coefficient of a second lane is in the range of 0.80~0.89, the lane reduction coefficient of a third lane is in the range of 0.65~0.78, the lane reduction coefficient of a fourth lane is in the range of 0.50~0.65, and the lane reduction coefficient of a fifth lane is in the range of 0.40~0.52.

When calculating the maximum traffic capacity of one lane of the road, the product of the standard maximum traffic capacity of the road, the intersection reduction coefficient of the road, the lane reduction coefficient of the lane, and a preset width reduction coefficient may be calculated. The product of the standard maximum traffic capacity of the road, the intersection reduction coefficient of the road, the lane reduction coefficient of the lane, and the width reduction coefficient is used as the maximum traffic capacity of the lane.

In some alternative implementations of the embodiment, an average number of the objects of the preset type at the intersections on the road to be evaluated for driving difficulty may be obtained in the following way. Road condition images collected at corresponding locations being the intersections of the road may be found from the acquired road condition images. In other words, the road condition images collected by the camera installed at each intersection of the road are found from the acquired road condition images.

When calculating the number of objects of the preset type at one intersection, a plurality of road condition images may be selected from road condition images collected by the camera installed at the intersection. Adjacent road condition images in the plurality of road condition images are collected at the interval of the preset time length. Then, by performing the image recognition on the plurality of road condition images, the objects of the preset type in each road condition image may be recognized. Thus, the number of the objects of the preset type in the each road condition image may be defined. The average value of the numbers of the recognized objects of the preset type is calculated, and the average value is used as the number of the objects of the preset type at the intersection.

The number of objects of the preset type at the each intersection of the road may be respectively calculated. Then, the average value of the numbers of the objects of the preset type at the intersection of the road is calculated, and the average value of the numbers of the objects of the preset type at the intersection of the road is used as the average number of the objects of the preset type at the intersection on the road.

For example, the objects of the preset type are pedestrians at the intersections on the road, and the preset time length is one minute. When calculating the number of pedestrians at one intersection, the number of the selected road condition images is 15. In other words, the selected road condition images are 15 road condition images collected by the camera installed at the intersection at an interval of one minute within 15 minutes. The number of pedestrians in each road condition image may be defined. An average value of the numbers of the recognized pedestrians is calculated, and the average value is used as the number of pedestrians at the intersection.

In some alternative implementations of this embodiment, the average number of the conflict points of the intersections on the road to be evaluated for driving difficulty may be defined in the following way. The road condition images collected at corresponding locations being the intersections on the road may be found from the acquired road condition images. In other words, the road condition images collected by the cameras installed at the intersections on the road are found from the acquired road condition images.

When calculating the number of conflict points at one intersection on the road, changing situations of driving directions of a plurality of vehicles at the intersection and changing situations of states of traffic signal lights may be determined based on a plurality of adjacent road condition images collected at the interval of the preset time length at the intersection. Based on the changes of the driving directions of the vehicles and a plurality of changing states of the traffic signal lights, a plurality of traffic states at the intersection are determined. Then, diverging conflict points, merging conflict points, and crossing conflict points of the intersection may respectively be determined. The sum of the diverging conflict points, the merging conflict points, and the crossing conflict points of the intersection is calculated to obtain the number of the conflict points at the intersection.

The number of conflict points of each intersection on the road may respectively be calculated. Then, an average value of the numbers of the conflict points of the intersections on the road is calculated, and the average value of the numbers of the conflict points of the intersections on the road is used as the average number of the conflict points of the intersections on the road.

In this embodiment, the number of the conflict points of the each intersection may also be calculated using the intersection conflict point full steering calculation formula.

Step 203, inputting the traffic environment information into a driving difficulty evaluation model to obtain a driving difficulty level of the road for an autonomous driving vehicle.

In this embodiment, the driving difficulty evaluation model is used to represent the corresponding relationship between the traffic environment information and the driving difficulty level. Each information item in the traffic environment information corresponds to one model parameter of the driving difficulty evaluation model, and a parameter value of each model parameter indicates an importance degree when the information item corresponding to the model parameter is used to define the driving difficulty level. Information items belonging to the same type in the traffic environment information of all roads correspond to the same model parameter of the driving difficulty evaluation model. For example, for the average speed of the vehicles, the average speeds of the vehicles in the traffic environment information of all the roads correspond to the same model parameter of the driving difficulty evaluation model, the model parameter representing the average speed of the vehicles. For the average number of the conflict points of the intersections on the road, the average numbers of the conflict points of the intersections in the traffic environment information of all the roads correspond to the same model parameter of the driving difficulty evaluation model, the model parameter representing the average number of the conflict points of the intersections.

In this embodiment, the acquired road condition images may be the road condition images of the road to be evaluated for driving difficulty collected during the time period (for example, the morning rush hour or the evening rush hour). The generated traffic environment information may be the traffic environment information of the road to be evaluated for driving difficulty during the time period. Correspondingly, the traffic environment information of the road to be evaluated for driving difficulty during the time period is inputted into the driving difficulty evaluation model, and the obtained driving difficulty level of the road to be evaluated for driving difficulty for the autonomous driving vehicle may be a driving difficulty level of the road to be evaluated for driving difficulty for the autonomous driving vehicle during the time period.

In this embodiment, a model of a preset type may be pre-trained using a training sample, and the trained model of the preset type is defined as the driving difficulty evaluation model. The model of the preset type may be a type of model for obtaining, based on an inputted feature, an object to which the feature belongs. For example, the model of the preset type is a support vector machine (SVM) model.

In this embodiment, when evaluating the driving difficulty of the road for the autonomous driving vehicle, an input vector corresponding to the traffic environment information of the road may first be generated. The input vector includes a respective component representing an information item in the traffic environment information of the road. Then, the input vector is inputted into the driving difficulty evaluation model, to obtain an output vector representing the driving difficulty level of the road for the autonomous driving vehicle and outputted by the driving difficulty evaluation model.

In this embodiment, in order to obtain the driving difficulty evaluation model, the model of the preset type may first be created, and the each model parameter of the model of the preset type corresponds to one information item in the traffic environment information. Then, the model of the preset type is initialized, and the each model parameter has an initial value. Finally, the model of preset type may be trained using a plurality of training samples and annotation information of the plurality of training samples, and the trained model of the preset type is defined as the driving difficulty evaluation model. One training sample includes traffic environment information of one road, and the annotation information of the sample is the annotated driving difficulty level of the road for the autonomous driving vehicle.

In this embodiment, the annotation information of the plurality of training samples may be obtained in the following way. First, clustering is performed in accordance with similarities between pieces of traffic environment information based on the traffic environment information in the plurality of training samples, to obtain a plurality of clustering results. The number of the clustering results may be used as a number of driving difficulty levels. Then, based on a size relationship between the same type of information items in the traffic environment information in the training samples between the clustering results, and accident occurrence rates of roads to which the traffic environment information in the training samples between the clustering results belongs, a level relationship between driving difficulties of the roads to which the traffic environment information in the training samples between the clustering results belongs may be determined. For example, two training samples are selected from one clustering result, and two samples are selected from another clustering result. Based on the size relationship between the information items in the traffic environment information, and the accident occurrence rates of the roads to which the traffic environment information in the training samples between the clustering results belongs, it is determined that the driving difficulties of the roads to which the traffic environment information in the two training samples selected from the one clustering result belongs are greater than the driving difficulties of the roads to which the traffic environment information in the two training samples selected from the another clustering result belongs. Accordingly, it may be determined that the driving difficulty corresponding to the one clustering result is greater than the driving difficulty corresponding to the another clustering result.

After the level relationship between the driving difficulties corresponding to all the clustering results is determined, a sequence number indicating the driving difficulty level may be assigned to each clustering result in order of driving difficulty from low to high. The larger is the sequence number, the higher is the driving difficulty level. The sequence number of the clustering result corresponding to the lowest driving difficulty may be 1. Accordingly, the sequence number of the each clustering result is greater by 1 than the sequence number of the former clustering result in the clustering results ordered from low to high. The driving difficulty levels of the roads to which the traffic environment information in all training samples in one clustering result are the driving difficulty level corresponding to the clustering result, thereby completing the annotation for the samples in the clustering result. After the driving difficulty level corresponding to the each clustering result is defined, the annotation for all the training samples may be completed, so as to obtain the annotation information of all the training samples.

In some alternative implementations of this embodiment, the driving difficulty evaluation model may be trained by pre-training a neural network for generating the driving difficulty evaluation model. The neural network for generating the driving difficulty evaluation model may first be created. Network parameters of the neural network for generating the driving difficulty evaluation model include: weight parameters. Each weight parameter corresponds to an information item in the traffic environment information, and a parameter value of the each weight parameter indicates the importance degree when the information item corresponding to the weight parameter is used to define the driving difficulty level.

The information items belonging to the same type in the traffic environment information of all the roads correspond to the same weight parameter of the neural network. For example, for the average speed of the vehicles, the average speeds of the vehicles in the traffic environment information of all the roads correspond to the same weight parameter of the driving difficulty evaluation model, the weight parameter representing the average speed of the vehicles. For the average number of the conflict points of intersections on the road, the average numbers of the conflict points of the intersections in the traffic environment information of all the roads correspond to the same weight parameter of the neural network, the weight parameter representing the average number of the conflict points of intersections.

When training the created neural network, a plurality of training samples and annotation information of each training sample are acquired. A training sample includes: traffic environment information of a road. The annotation information of the training sample includes: a driving difficulty level of the road to which the traffic environment information in the training sample belongs. Road traffic environment information of a road in the training sample may be road traffic environment information of the road during a time period. The annotated driving difficulty level of the road to which the traffic environment information in the training sample belongs in the annotation information in training sample may be the annotated driving difficulty level of the road to which the traffic environment information in the training sample belongs during the time period.

The neural network may be trained using the plurality of training samples and the annotation information of the each training sample in a supervised learning mode. After the neural network is trained using the plurality of training samples and the annotation information of the each training sample in the supervised learning mode, the trained neural network is defined as the driving difficulty evaluation model. In other words, the trained neural network may be referred to as the driving difficulty evaluation model.

When training the neural network using one training sample, the one training sample may be inputted into the neural network to obtain a driving difficulty level predicted by the neural network. A difference between the predicted driving difficulty level and the driving difficulty level in the annotation information of the training sample may be calculated using a preset loss function. Gradient information may be calculated using a gradient descent algorithm based on the difference. The gradient information indicates a correlation between a parameter value of each current weight parameter and the difference. Then, based on the gradient information, parameter values of the weight parameters in the neural network may be adjusted.

For example, the neural network for generating the driving difficulty evaluation model is a recurrent neural network (RNN). A hidden layer of the RNN for generating the driving difficulty evaluation model includes a plurality of hidden layer nodes. Each hidden layer node corresponds to a respective information item in the traffic environment information. The each hidden layer node has one weight parameter. The information items belonging to the same type in the traffic environment information of all the roads correspond to the same hidden layer node of the RNN for generating the driving difficulty evaluation model. For example, for the average speed of the vehicles, the average speeds of the vehicles in the traffic environment information of all the roads correspond to the same hidden layer node of the RNN for generating the driving difficulty evaluation model, the hidden layer node representing the average speed of the vehicles. For the average number of the conflict points of the intersections on the road, the average numbers of the conflict points of the intersections in the traffic environment information of all the roads correspond to the same hidden layer node of the RNN for generating the driving difficulty evaluation model, the hidden layer node representing the average number of the conflict points of the intersections.

When training the RNN for generating the driving difficulty evaluation model using the one training sample, normalization is performed on each information item in the traffic environment information of one road in the sample may be performed, to obtain a normalized value corresponding to the each information item.

For example, for the average speed of the vehicles in the one road, a preset speed level corresponding to the average speed of the vehicles on the road is used as the normalized value corresponding to the average speed of the vehicles on the road. For the number of the obstacles on the road, a preset obstacle number level corresponding to the number of the obstacles on the road may be used as the normalized value corresponding to the number of the obstacles on the road. After the normalized value corresponding to the each information item is obtained, an input vector of the RNN for generating the driving difficulty evaluation model may be generated. Each component in the input vector of the RNN for generating the driving difficulty evaluation model is the normalized value corresponding to the each information item. Then, the input vector is inputted into the RNN for generating the driving difficulty evaluation model. In the RNN for generating the driving difficulty evaluation model, forward propagation is performed based on the input vector and the weight parameter in the RNN for generating the driving difficulty evaluation model, to obtain the predicted driving difficulty level. The difference between the predicted driving difficulty level and the annotated driving difficulty level in the annotation information of the training sample is calculated using the preset loss function. Then the gradient information is calculated, and the gradient information includes the correlation between the parameter value of the current weight parameter in the RNN for generating the driving difficulty evaluation model and the difference. Then, based on the correlation, the parameter values of the weight parameters in the RNN for generating the driving difficulty evaluation model are adjusted.

After being trained using the plurality of training samples and the annotation information of the training samples, the RNN for generating the driving difficulty evaluation model (i.e. the driving difficulty evaluation model) may be used to represent the corresponding relationship between the traffic environment information and the driving difficulty level. When evaluating the driving difficulty of a road for the autonomous driving vehicle, the input vector of the trained RNN for generating the driving difficulty evaluation model corresponding to the traffic environment information of the road may be generated. The each component in the input vector is the value after performing the normalization on the one information item in the traffic environment information of the road. The input vector is inputted into the trained RNN for generating the driving difficulty evaluation model, to obtain the output vector representing the driving difficulty level of the road for the autonomous driving vehicle and outputted by the trained RNN for generating the driving difficulty evaluation model.

Figure 3:
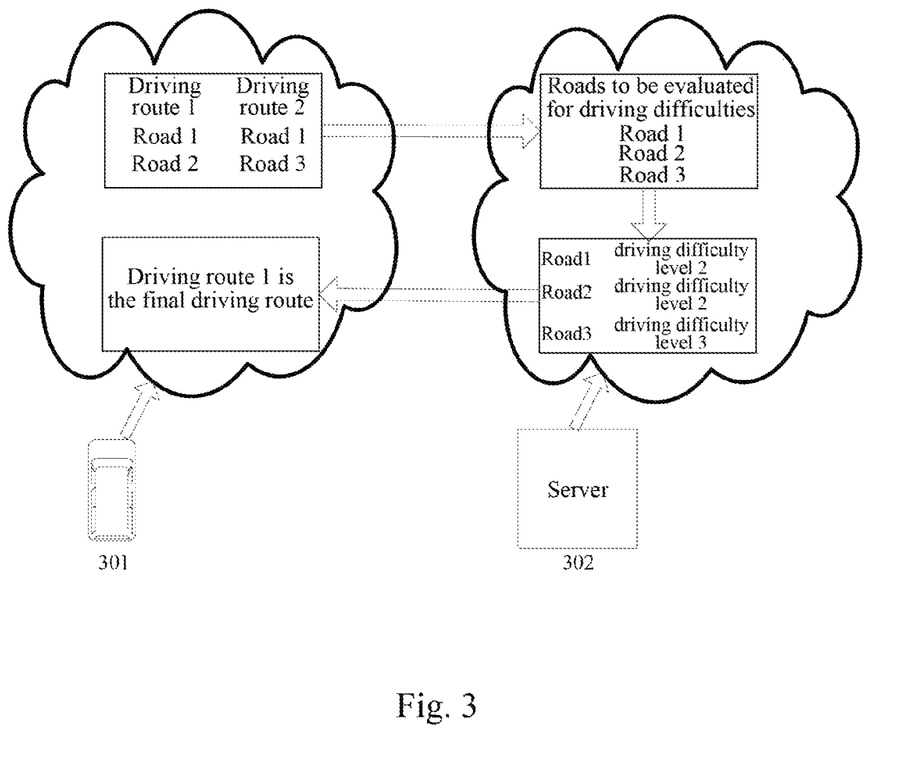
FIG. 3 is a schematic diagram of an application scenario of the method for generating information according to the present disclosure.

Referring to FIG. 3, FIG. 3 is a schematic diagram of an application scenario of the method for generating information according to the embodiment.

In the application scenario of FIG. 3, the autonomous driving vehicle 301 automatically and preliminarily plans two candidate driving routes based on the current location and the destination location inputted by the user. The candidate driving route 1 includes the road 1 and the road 2, and the candidate driving route 2 includes the road 1 and the road 3. Then, the autonomous driving vehicle 301 sends an evaluation request to the server 302. The evaluation request includes the name of the road 1, the name of the road 2, and the name of the road 3. The server 302 pre-evaluates the driving difficulties of the road 1, the road 2, and the road 3 for the autonomous driving vehicle 301 during the current time period (for example, the morning rush hour), to obtain the driving difficulty levels of the road 1, the road 2, and the road 3 for the autonomous driving vehicle 301 during the current time period. The driving difficulty level of the road 2 for the autonomous driving vehicle 301 is less than the driving difficulty level of the road 3 for the autonomous driving vehicle 301. That is, the driving difficulty of the road 2 for the autonomous driving vehicle 301 is less than the driving difficulty of the road 3 for the autonomous driving vehicle 301. The server 302 sends the pre-evaluated driving difficulty levels of the road 1, the road 2, and the road 3 for the autonomous driving vehicle 301 to the autonomous driving vehicle 301. The autonomous driving vehicle 301 re-determines the candidate driving route 1 as the final driving route.

Figure 4:
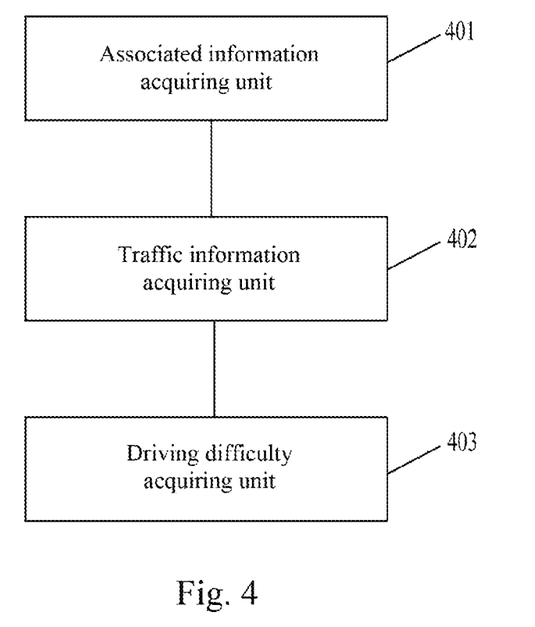
FIG. 4 is a schematic structural diagram of an embodiment of the apparatus for generating information according to the present disclosure.

Referring to FIG. 4, as an implementation of the method shown in the above figures, the present disclosure provides an embodiment of an apparatus for generating information. The embodiment of the apparatus corresponds to the embodiment of the method illustrated in FIG. 2, and the apparatus may be applied in a server.

As shown in FIG. 4, the apparatus for generating information according to this embodiment includes: an associated information acquiring unit 401, a traffic information acquiring unit 402, and a driving difficulty acquiring unit 403. The associated information acquiring unit 401 is configured to acquire associated information of a road to be evaluated for driving difficulty. The associated information includes road condition images and road attributes. The traffic information acquiring unit 402 is configured to generate traffic environment information of the road based on the associated information. The driving difficulty acquiring unit 403 is configured to input the traffic environment information of the road into a driving difficulty evaluation model to obtain a driving difficulty level of the road for an autonomous driving vehicle. The driving difficulty evaluation model is used to represent a corresponding relationship between the traffic environment information and the driving difficulty level, each information item in the traffic environment information corresponds to a model parameter of the driving difficulty evaluation model, and a parameter value of each model parameter indicates an importance degree when an information item corresponding to the model parameter is used to define the driving difficulty level.

In some alternative implementations of this embodiment, the traffic environment information includes at least one of: an average speed of vehicles on the road, a saturation of the road indicating a congestion degree of the road, an average number of objects of a preset type at intersections on the road, an average number of conflict points of the intersections on the road, a number of obstacles on the road, or a number of road facilities on the road.

In some alternative implementations of this embodiment, the apparatus for generating information further includes: a neural network creating unit, configured to create a neural network for generating the driving difficulty evaluation model, wherein network parameters of the neural network include weight parameters, each weight parameter corresponds to an information item in the traffic environment information, and a parameter value of the each weight parameter indicates an importance degree when the information item corresponding to the weight parameter is used to define the driving difficulty level; a sample acquiring unit, configured to acquire a plurality of training samples and annotation information of each training sample, wherein the training samples include the traffic environment information of the road, and the annotation information of the training sample includes an annotated driving difficulty level of the road; a neural network training unit, configured to train the neural network using the plurality of training samples and the annotation information of the each training sample in a supervised learning mode; and a model acquiring unit, configured to define the trained neural network as the driving difficulty evaluation model.

In some alternative implementations of this embodiment, the neural network training unit is further configured to: perform, for the each training sample of the plurality of training samples, following training: inputting the training sample into the neural network to obtain a predicted driving difficulty level; determining a difference between the predicted driving difficulty level and the driving difficulty level in the annotation information of the training sample, and calculating gradient information based on the difference, the gradient information indicating a correlation between a parameter value of each current weight parameter of the neural network and the difference; and adjusting the parameter value of the weight parameter of the neural network based on the gradient information.

In some alternative implementations of this embodiment, the traffic information acquiring unit includes: an average speed calculating subunit. The average speed calculating subunit is configured to find, from the acquired road condition images, road condition images corresponding to a collection location being a starting point or an end point of the road, wherein a collection location corresponding to a road condition image is a location of a camera collecting the one road condition image; determine vehicles passing through the road based on the found road condition images; calculate, for each determined vehicle passing through the road, a time difference between time collecting the road condition image in which a location of the vehicle is the starting point of the road and time collecting the road condition image in which a location of the vehicle is the end point of the road, and divide the length of the road by the time difference to obtain a speed of the vehicle; and calculate an average value of speeds of the determined vehicles passing through the road and use the average value as the average speed of the vehicles on the road.

In some alternative implementations of this embodiment, the traffic information acquiring unit includes: a saturation calculating subunit. The saturation calculating subunit is configured to determine, when the road attributes include a type of the road, a number of lanes of the road, and widths of the lanes of the road, vehicles passing through the road in a preset time length based on road condition images corresponding to collection locations being a starting point and an end point of the road in the acquired road condition images, wherein a collection location corresponding to a road condition image is a location of a camera collecting the road condition image; calculate a number of vehicles passing through the road in the unit time based on a number of the vehicles passing through the road in the preset time length and the preset time length; calculate a maximum traffic capacity of the road based on the road attributes, wherein the maximum traffic capacity of the road is a maximum number of the vehicles passing through the road in the unit time; and divide the number of the vehicles passing through the road in the unit time by the maximum traffic capacity to obtain the saturation of the road.

In some alternative implementations of this embodiment, the traffic information acquiring unit includes: an object number calculating subunit. The object number calculating subunit is configured to find, from the acquired road condition images, road condition images corresponding to collection locations being the intersections of the road, wherein a collection location corresponding to a road condition image is a location of a camera collecting the road condition image; determine, for each intersection of the road, a plurality of road condition images corresponding to a collection location being the intersection in the found road condition images, wherein a time difference between time collecting adjacent road condition images in the plurality of road condition images is a preset time length; perform image recognition on the plurality of road condition images; calculate an average value of numbers of the recognized objects of the preset type; use the average value as a number of the objects of the preset type at the intersection; calculate an average value of numbers of the objects of the preset type at the intersections of the road; and use the average value of the numbers of the objects of the preset type at the intersections of the road as the average number of the objects of the preset type at the intersections of the road.

In some alternative implementations of this embodiment, the traffic information acquiring unit includes: a conflict point number calculating subunit. The conflict point number calculating subunit is configured to find, from the acquired road condition images, road condition images corresponding to collection locations being the intersections of the road, wherein a collection location corresponding to a road condition image is a location of a camera collecting the road condition image; determine, for each intersection of the road, a plurality of road condition images corresponding to a collection location being the intersection in the found road condition images; determine changing situations of driving directions of vehicles at the intersection and changing situations of states of traffic signal lights based on the plurality of road condition images; determine conflict points of the intersection based on the changing situations of the driving directions of the vehicles at the intersection and the changing situations of the states of the traffic signal lights; and calculate an average value of numbers of the conflict points of the intersections on the road, and use the average value as the average number of the conflict points of the intersections on the road.

Figure 5:
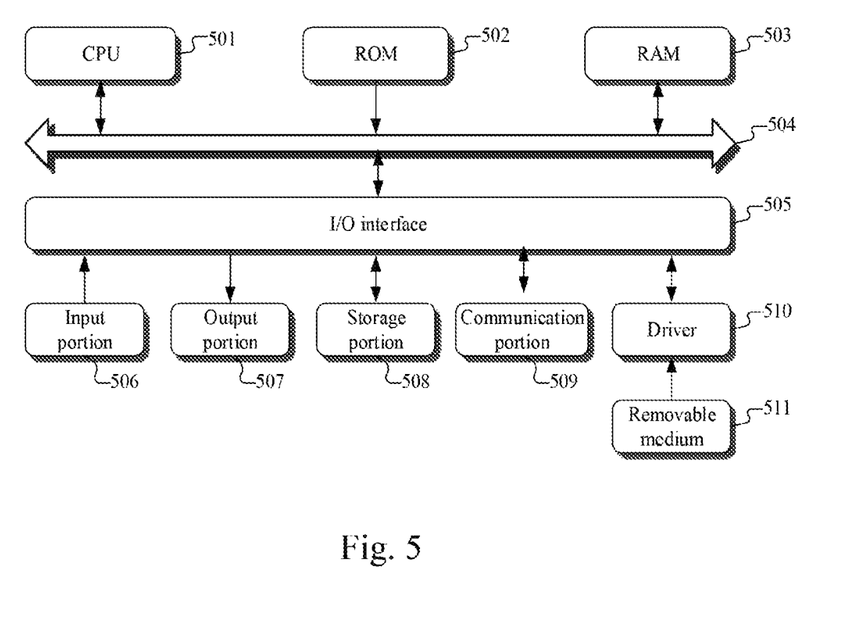
FIG. 5 is a schematic structural diagram of a computer system adapted to implement a server according to embodiments of the present disclosure.

FIG. 5 illustrates a schematic structural diagram of a computer system adapted to implement a server according to embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

The present disclosure further provides a server, the server may be configured with one or more processors; and a memory, for storing one or more programs, the one or more programs may include instruction for performing operations described in steps 201-203. The one or more programs, when executed by the one or more processors, cause the one or more processors to perform the operations described in steps 201-203.

The present disclosure further provides a computer-readable storage medium. The computer-readable storage medium may be the computer storage medium included in the server in the above described embodiments, or a stand-alone computer-readable storage medium not assembled into the server. The computer-readable storage medium stores one or more programs. The one or more programs, when executed by the server, cause the server to: acquiring associated information of a road to be evaluated for driving difficulty, the associated information including road condition images and road attributes; generating traffic environment information of the road based on the associated information; and inputting the traffic environment information of the road into a driving difficulty evaluation model to obtain a driving difficulty level of the road for an autonomous driving vehicle, the driving difficulty evaluation model being used to represent a corresponding relationship between the traffic environment information and the driving difficulty level, each information item in the traffic environment information corresponding to a model parameter of the driving difficulty evaluation model, and a parameter value of each model parameter indicating an importance degree when an information item corresponding to the model parameter is used to define the driving difficulty level.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an associated information acquiring unit, a traffic information acquiring unit, and a driving difficulty acquiring unit, where the names of these units do not in some cases constitute a limitation to such units themselves. For example, the associated information acquiring unit may also be described as "a unit for acquiring associated information of a road to be evaluated for driving difficulty."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
   acquiring associated information of a road to be evaluated for driving difficulty, the associated information including road condition images and road attributes;
   generating traffic environment information of the road based on the associated information; and
   inputting the traffic environment information of the road into a driving difficulty evaluation model to obtain a driving difficulty level of the road for an autonomous driving vehicle, the driving difficulty evaluation model being used to represent a corresponding relationship between the traffic environment information and the driving difficulty level, each information item in the traffic environment information corresponding to a model parameter of the driving difficulty evaluation model, and a parameter value of each model parameter indicating an importance degree when an information item corresponding to the model parameter is used to define the driving difficulty level.

2. The method according to claim 1, wherein the traffic environment information includes at least one of: an average speed of vehicles on the road, a saturation of the road indicating a congestion degree of the road, an average number of objects of a preset type at intersections on the road, an average number of conflict points of the intersections on the road, a number of obstacles on the road, or a number of road facilities on the road.

3. The method according to claim 2, wherein the driving difficulty evaluation model is obtained by:
   creating a neural network for generating the driving difficulty evaluation model, wherein network parameters of the neural network include weight parameters, each weight parameter corresponds to an information item in the traffic environment information, and a parameter value of the each weight parameter indicates an importance degree when the information item corresponding to the weight parameter is used to define the driving difficulty level;
   acquiring a plurality of training samples and annotation information of each training sample, wherein the training samples include the traffic environment information of the road, and the annotation information of the training sample includes an annotated driving difficulty level of the road;
   training the neural network using the plurality of training samples and the annotation information of the each training sample in a supervised learning mode; and
   defining the trained neural network as the driving difficulty evaluation model.

4. The method according to claim 3, wherein the training the neural network using the plurality of training samples and the annotation information of the each training sample in a supervised learning mode comprises:
   performing, for the each training sample of the plurality of training samples, following training: inputting the training sample into the neural network to obtain a predicted driving difficulty level; determining a difference between the predicted driving difficulty level and the driving difficulty level in the annotation information of the training sample, and calculating gradient information based on the difference, the gradient information indicating a correlation between a parameter value of each current weight parameter of the neural network and the difference; and adjusting the parameter value of the weight parameter of the neural network based on the gradient information.

5. The method according to claim 4, wherein the road attributes include a length of the road; and
   the generating traffic environment information of the road based on the associated information comprises:
   finding, from the acquired road condition images, road condition images corresponding to a collection location being a starting point or an endpoint of the road, wherein a collection location corresponding to a road condition image is a location of a camera collecting the road condition image;
   determining vehicles passing through the road based on the found road condition images;
   calculating, for each determined vehicle passing through the road, a time difference between time collecting the road condition image in which a location of the vehicle is the starting point of the road and time collecting the road condition image in which a location of the vehicle is the end point of the road, and dividing the length of the road by the time difference to obtain a speed of the vehicle; and calculating an average value of speeds of the determined vehicles passing through the road, and using the average value as the average speed of the vehicles on the road.

6. The method according to claim 4, wherein the road attributes include a type of the road, a number of lanes of the road, and widths of the lanes of the road; and the generating traffic environment information of the road based on the associated information comprises:

determining vehicles passing through the road in a preset time length based on road condition images corresponding to collection locations being a starting point and an end point of the road in the acquired road condition images, wherein a collection location corresponding to a road condition image is a location of a camera collecting the road condition image;

calculating a number of vehicles passing through the road in unit time based on a number of the vehicles passing through the road in the preset time length and the preset time length;

calculating a maximum traffic capacity of the road based on the road attributes, wherein the maximum traffic capacity of the road is a maximum number of the vehicles passing through the road in the unit time; and dividing the number of the vehicles passing through the road in the unit time by the maximum traffic capacity to obtain the saturation of the road.

7. The method according to claim 4, wherein the generating traffic environment information of the road based on the associated information comprises:

finding, from the acquired road condition images, road condition images corresponding to collection locations being the intersections of the road, wherein a collection location corresponding to a road condition image is a location of a camera collecting the road condition image;

determining, for each intersection of the road, a plurality of road condition images corresponding to a collection location being the intersection in the found road condition images, wherein a time difference between time collecting adjacent road condition images in the plurality of road condition images is a preset time length;

performing image recognition on the plurality of road condition images; calculating an average value of numbers of the recognized objects of the preset type; and using the average value as a number of the objects of the preset type at the intersection; and calculating an average value of numbers of the objects of the preset type at the intersections of the road; and using the average value of the numbers of the objects of the preset type at the intersections of the road as the average number of the objects of the preset type at the intersections of the road.

8. The method according to claim 4, wherein the generating traffic environment information of the road based on the associated information comprises:

finding, from the acquired road condition images, road condition images corresponding to collection locations being the intersections of the road, wherein a collection location corresponding to a road condition image is a location of a camera collecting the road condition image;

determining, for each intersection of the road, a plurality of road condition images corresponding to a collection location being the intersection in the found road condition images; determining changing situations of driving directions of vehicles at the intersection and changing situations of states of traffic signal lights based on the plurality of road condition images; and determining conflict points of the intersection based on the changing situations of the driving directions of the vehicles at the intersection and the changing situations of the states of the traffic signal lights; and calculating an average value of numbers of the conflict points of the intersections on the road, and using the average value as the average number of the conflict points of the intersections on the road.

9. An apparatus for generating information, comprising:

at least one processor; and a memory storing instructions, the instructions when executed by the at least one processor, cause the at least one processor to perform operations, the operations comprising:

acquiring associated information of a road to be evaluated for driving difficulty, the associated information including road condition images and road attributes;

generating traffic environment information of the road based on the associated information; and inputting the traffic environment information of the road into a driving difficulty evaluation model to obtain a driving difficulty level of the road for an autonomous driving vehicle, the driving difficulty evaluation model being used to represent a corresponding relationship between the traffic environment information and the driving difficulty level, each information item in the traffic environment information corresponding to a model parameter of the driving difficulty evaluation model, and a parameter value of each model parameter indicating an importance degree when an information item corresponding to the model parameter is used to define the driving difficulty level.

10. The apparatus according to claim 9, wherein the traffic environment information includes at least one of: an average speed of vehicles on the road, a saturation of the road indicating a congestion degree of the road, an average number of objects of a preset type at intersections on the road, an average number of conflict points of the intersections on the road, a number of obstacles on the road, or a number of road facilities on the road.

11. The apparatus according to claim 10, the driving difficulty evaluation model is obtained by:

creating a neural network for generating the driving difficulty evaluation model, wherein network parameters of the neural network include weight parameters, each weight parameter corresponds to an information item in the traffic environment information, and a parameter value of the each weight parameter indicates an importance degree when the information item corresponding to the weight parameter is used to define the driving difficulty level;

acquiring a plurality of training samples and annotation information of each training sample, wherein the training samples include the traffic environment information of the road, and the annotation information of the training sample includes an annotated driving difficulty level of the road;

training the neural network using the plurality of training samples and the annotation information of the each training sample in a supervised learning mode; and defining the trained neural network as the driving difficulty evaluation model.

12. The apparatus according to claim 11, wherein the training the neural network using the plurality of training samples and the annotation information of the each training sample in a supervised learning mode comprises: performing, for the each training sample of the plurality of training samples, following training: inputting the training sample into the neural network to obtain a predicted driving difficulty level; determining a difference between the predicted driving difficulty level and the driving difficulty level in the annotation information of the training sample, and calculating gradient information based on the difference, the gradient information indicating a correlation between a parameter value of each current weight parameter of the neural network and the difference; and adjusting the parameter value of the weight parameter of the neural network based on the gradient information.

13. The apparatus according to claim 12, wherein the road attributes include a length of the road; and
the generating traffic environment information of the road based on the associated information comprises:
finding, from the acquired road condition images, road condition images corresponding to a collection location being a starting point or an endpoint of the road, wherein a collection location corresponding to a road condition image is a location of a camera collecting the one road condition image; determining vehicles passing through the road based on the found road condition images; calculating, for each determined vehicle passing through the road, a time difference between time collecting the road condition image in which a location of the vehicle is the starting point of the road and time collecting the road condition image in which a location of the vehicle is the end point of the road, and dividing the length of the road by the time difference to obtain a speed of the vehicle; and calculating an average value of speeds of the determined vehicles passing through the road and using the average value as the average speed of the vehicles on the road.

14. The apparatus according to claim 12, wherein the road attributes include a type of the road, a number of lanes of the road, and widths of the lanes of the road, and
the generating traffic environment information of the road based on the associated information comprises:
determining vehicles passing through the road in a preset time length based on road condition images corresponding to collection locations being a starting point and an end point of the road in the acquired road condition images, wherein a collection location corresponding to a road condition image is a location of a camera collecting the road condition image; calculating a number of vehicles passing through the road in unit time based on a number of the vehicles passing through the road in the preset time length and the preset time length; calculating a maximum traffic capacity of the road based on the road attributes, wherein the maximum traffic capacity of the road is a maximum number of the vehicles passing through the road in the unit time; and dividing the number of the vehicles passing through the road in the unit time by the maximum traffic capacity to obtain the saturation of the road.

15. The apparatus according to claim 12, wherein the generating traffic environment information of the road based on the associated information comprises:
finding, from the acquired road condition images, road condition images corresponding to collection locations being the intersections of the road, wherein a collection location corresponding to a road condition image is a location of a camera collecting the road condition image; determining, for each intersection of the road, a plurality of road condition images corresponding to a collection location being the intersection in the found road condition images, wherein a time difference between time collecting adjacent road condition images in the plurality of road condition images is a preset time length; performing image recognition on the plurality of road condition images; calculate an average value of numbers of the recognized objects of the preset type; using the average value as a number of the objects of the preset type at the intersection; calculating an average value of numbers of the objects of the preset type at the intersections of the road; and using the average value of the numbers of the objects of the preset type at the intersections of the road as the average number of the objects of the preset type at the intersections of the road.

16. The apparatus according to claim 12, wherein the generating traffic environment information of the road based on the associated information comprises:
finding, from the acquired road condition images, road condition images corresponding to collection locations being the intersections of the road, wherein a collection location corresponding to a road condition image is a location of a camera collecting the road condition image; determining, for each intersection of the road, a plurality of road condition images corresponding to a collection location being the intersection in the found road condition images; determining changing situations of driving directions of vehicles at the intersection and changing situations of states of traffic signal lights based on the plurality of road condition images; determining conflict points of the intersection based on the changing situations of the driving directions of the vehicles at the intersection and the changing situations of the states of the traffic signal lights; and calculating an average value of numbers of the conflict points of the intersections on the road, and using the average value as the average number of the conflict points of the intersections on the road.

17. A non-transitory computer storage medium storing a computer program, the computer program when executed by one or more processors, causes the one or more processors to perform operations, the operations comprising:
acquiring associated information of a road to be evaluated for driving difficulty, the associated information including road condition images and road attributes;
generating traffic environment information of the road based on the associated information; and
inputting the traffic environment information of the road into a driving difficulty evaluation model to obtain a driving difficulty level of the road for an autonomous driving vehicle, the driving difficulty evaluation model being used to represent a corresponding relationship between the traffic environment information and the driving difficulty level, each information item in the traffic environment information corresponding to a model parameter of the driving difficulty evaluation model, and a parameter value of each model parameter indicating an importance degree when an information item corresponding to the model parameter is used to define the driving difficulty level.

* * * * *

UNITED STATES PATENT AND TRADEMARK OFFICE
CERTIFICATE OF CORRECTION

| | |
|---|---|
| PATENT NO. | : 10,809,723 B2 |
| APPLICATION NO. | : 16/134850 |
| DATED | : October 20, 2020 |
| INVENTOR(S) | : Fanduo Kong et al. |

It is certified that error appears in the above-identified patent and that said Letters Patent is hereby corrected as shown below:

On the Title Page

Below item (65), insert -- (30) Foreign Application Priority Data
Dec. 11, 2017   (CN) ....................201711309598.2 --.

In the Claims

At Column 18, Line 56, "endpoint" should be -- end point --.

At Column 21, Line 23, "endpoint" should be -- end point --.

Signed and Sealed this
Eleventh Day of June, 2024

Katherine Kelly Vidal
*Director of the United States Patent and Trademark Office*